United States Patent [19]

Guez

[11] Patent Number: 5,748,762
[45] Date of Patent: May 5, 1998

[54] HIERARCHICAL MULTI-RESOLUTION, MULTI-AGENT PARTS NESTING PROCESS

[76] Inventor: Allon Guez, 560 Sprague Rd., Penn Valley, Pa. 19072

[21] Appl. No.: 609,516

[22] Filed: Mar. 1, 1996

[51] Int. Cl.$^6$ .................................................. G06K 9/00
[52] U.S. Cl. ................................. 382/111; 364/474.13
[58] Field of Search ........................... 382/111, 284, 382/286, 294; 348/88; 364/474.13, 474.15; 83/75.5, 936

[56] References Cited

U.S. PATENT DOCUMENTS

| | | | |
|---|---|---|---|
| 4,941,182 | 7/1990 | Bruder et al. | 382/8 |
| 4,982,437 | 1/1991 | Loriot | 382/8 |
| 5,258,917 | 11/1993 | Bruder et al. | 364/474.13 |

OTHER PUBLICATIONS

Chung, J; D. Scott; D.J. Hillman, "An intelligent nesting system on 2-D highly irregular resources", SPIE, vol. 1293, 1990, pp. 472–483.

Jin, B; A. Guez, "A Multitask Neuromorphic Controller for Redundant Robots", Proceedings of the 33$^{rd}$ IEEE Int'l Conf. on Decision and Control, Dec., 1994, pp. 1–6.

Whelam, P.F.; B. G. Batchelor, "Automated packing systems: Review of Industrial Implementations", SPIE, vol. 2064, pp. 358–369.

Whelan, P.F.; B.G. Batchelor, "Automated packing of bitrary shapes", SPIE, vol. 1615, Machine Vision Architectures, Integration, and Applications, 1991, pp. 77–86.

*Primary Examiner*—Andrew Johns
*Attorney, Agent, or Firm*—Gina M. Gualtieri, Agent for Applicant

[57] ABSTRACT

A fast process for two-dimensional nesting of cut patterns to be cut from a sheet material such as natural and artificial leather or hide, or fabric is proposed. The proposed process of nesting incorporates heuristic rules for the initial placement of cut patterns represented at the lowest resolution. After the initialization process, the process exhaustively finds the best solution at the initial resolution. The final stage involves a multi-agent method that is hierarchical in nature. The hierarchical steps involve obtaining a feasible solution at the current resolution in which local information is used from each cut pattern to minimize a locally defined penalty function. This procedure is terminated when the desired/goal resolution is reached. This allows for a general method for parallel implementation of the multi-agent optimization scheme in which achievement of a solution occurs in a very rapid and efficient manner.

12 Claims, 1 Drawing Sheet

HIERARCHICAL MULTI-RESOLUTION, MULTI-AGENT PARTS NESTING PROCESS

BACKGROUND OF THE INVENTION

1. Field of the Invention

The present invention generally relates to a highly automatic method for two-dimensional nesting contours to be cut from pieces of sheet material such as natural and artificial leather or hide, fabric, paper, and the like. The nesting process involves placing non-overlapped cut patterns on a given area of material in a manner which maximally utilizes the material. The complexity of this process is related to both the material and the cut patterns including irregularities in the outline, defects (holes, scars, scratches and burn marks), variations in texture (surface appearance, thickness and softness), variations in color, and stretch characteristics (lines of tightness), in addition to the variety of shapes and quantity of parts associated with a given piece of material.

2. Description of the Related Art

State of the art solutions to the two-dimensional nesting problem include those which utilize interactive systems and those which utilize automatic systems. Interactive systems are systems in which the operator manipulates shapes and makes decisions on the nesting using computer aids. With interactive lay planning systems, three main approaches are typically employed: the projection method, the video camera method, and the off-line lay planning. The first two methods are on-line methods whereby the human operator interacts with the computer to find an optimal lay out planning. As its name implies, the projection method projects the components outlines onto the skin of the leather. The operator uses his visual and tactile skills to inspect the leather and then slides an electronic mouse on the surface of the leather to manipulate light images of the pieces with the aid of a computer. The video camera method differs in that an image of the leather is captured, and a replica is shown on the screen console. Once the image is available, pieces to be nested are fetched from a CAD file, and the operator tries to nest them in a way to minimize waste material. The third approach, off-line lay planning, assumes computer aided lay planning which is carried out away from the cutting machine and is not closely coupled with it. Details of the hides and their defects are captured with a camera or a digitizer and are fed to the work station. Simultaneously, the pieces to be nested are fetched from a CAD file, and are available for the operator to manipulate them. Once the optimal lay out is created on the computer screen, it is made available to the cutting machine. This approach is used with larger cutting systems which are designed for reasonably high levels of output. The interactive lay planning systems approach can lead to a material savings of approximately two to four per cent compared with manual cutting of leather, however, at present it is not possible to perform these procedures in real time. The main advantage of these types of systems are that a complete layout can be planned before a single piece is cut.

With automatic lay planning systems, the skin must be processed first. A human expert must first identify the defective areas in a hide. Next, an image of the hide is captured, either using a camera or a digitizer, where all defective areas must be clearly labelled. Once fed to the computer system, the automatic lay planning system fetches from a CAD file the shapes to be nested, and initiates its nesting algorithm to generate an optimal solution. Automatic lay planning systems are now being introduced to the textile and leather industry. The software receives as its inputs all information concerning hides and parts. The nesting system consists essentially of two modules. The artificial intelligence module for the nesting strategies which incorporates strategies captured from experienced nesters along with some heuristic-based rules and assignment, and the mathematical module for calculations such as nesting efficiency and whether a part can fit a space available. In some other systems, it is assumed that all the hides are scanned and saved in a database along with the pieces to be nested. This type of prototype comprises three modules: skin selection, target yield calculation, and automatic lay planning. In the automatic lay planning module, the "bump and slide" technique is the most common. This requires the placing of the pieces on the correct quality zones individually. The prototype system then orientates the pieces around the lines of tightness, and, upon completion, the number of placed patterns is compared to the target yield figure. If it is within an acceptable tolerance, the nesting is accepted for cutting.

Yet another design version for nesting patterns on hides and fabrics used in the automotive, furniture, shoe, and clothing industries exists. This version includes a scanning phase, and a nesting phase. After scanning and marking of quality grade areas and flaw types, nesting of the cut patterns begins using quality rules provided by leading industrial users as an automatic default that may require to be tailored to a particular hide/material.

In addition to these existing automatic systems, theoretical solutions for the two-dimensional nesting problem are provided. These theoretical solutions are grouped into categories including sequential assignment heuristics, whereby nesting of patterns is based on a set of assignment rules, single-pattern generating procedures, such as dynamic programming based algorithms which try and reuse a single 'optimal' nesting configuration, and multi-pattern generating procedures, such as linear programming based approaches which consider the interaction between patterns. The majority of heuristic approaches consist of determining the order and orientation in which the pieces should be nested. The multi-pattern generating procedure approach requires the solutions to be rounded and is, therefore, also heuristic in nature. The nesting task can be formulated as a binary integer problem in which a single variable represents each possible piece position.

Since the nesting problem is application dependent, lots of researchers have tried to solve it for a given specific application. Qu and Sanders (in Whelan and Batchelor, SPEI, Vol. 2064) discuss a heuristic nesting that assumes the cut patterns to be rectangles. The system places each part in an orientation such that (a) its length is greater than its height and (b) the largest complimentary area is in the upper-right corner. The parts are then sorted by non-increasing part height. The shapes are packed into a rectangular bounding region in a raster fashion. The major disadvantages with this approach are (a) that the use of rectangles is required to approximate the shape to be packed and (b) the assumption that good packing patterns will be orthogonal.

Dori and Ben-Bassat (in Whelan and Batchelor, SPEI, Vol. 2064) have also investigated the nesting of polygonal shapes. The authors decompose the task into two sub-problems. The first consist of the optimal (minimal waste) circumscription of the original irregular shape by the most appropriate convex polygon. The remaining problem consists of circumscribing the convex polygon by another polygon that can pave the plane. Limitations of this approach include the fact that it is only applicable to congruent convex figures and the assumption that the packing plane is infinite. Another limitation is the fact that it can only be applied to convex components with straight sides.

Chung, Scott and Hillman developed an automated nesting system which determines how to cut regular or irregular two-dimensional pieces from a regular or irregular shaped material having constraints, such as defective regions. The approach taken implements an object-oriented representational scheme in conjunction with a heuristic search procedure to determine an efficient nesting position. The authors concentrate on finding a satisfactory solution rather than trying to exhaust all possible positions for an optimal solution. A solution is satisfactory when its yield is better than or equal to the average of a human expert's solution. The overall system has been evaluated by comparing its performance to that of a human expert, and an average yield difference of within 5% has been claimed. Therefore, although it is time efficient, the overall yield may still be inferior to the human expert's.

Whelan and Batchelor have developed a system that will allow packing of arbitrary shapes into "arbitrary scene(s)". The packing consists of two major components: (a) a geometric packer, based upon the principles of mathematical morphology which takes an arbitrary shape in a given orientation and puts the shape into place, in that orientation; (b) and a heuristic packer, which is concerned with the ordering and alignment of shapes prior to applying them to the geometric packer. This component also deals with other general considerations, such as the conflict in problem constraints and the measurement of packing performance. In addition it deals with practical constraints, such as packing in the presence of defective regions, and pattern matching.

None of the methods of the prior art, however, provide an algorithm that is capable of addressing the two-dimensional nesting problem in real time in which contours are to be cut from pieces of sheet material in a manner which achieves maximum yield with minimum waste, in an efficient manner. The present invention nesting algorithm realizes these features by utilizing multi-agent properties, as described further herein, in addition to heuristic rules. The heuristic rules govern hierarchical steps such that a good initial guess at a coarse resolution is manipulated via an initial exhaustive search technique, time-limited relaxation via constrained reorientation and translation, and subsequent increases in resolution to provide a good approximation to the placement (layout) of the contours (shapes). The present invention nesting algorithm thereby decreases the burden of providing a good initial configuration by utilizing multi-agent optimization. The present invention multi-agent property exploits the local nature of minimizing waste by an effort made by each cut patterns (parts) to be placed/reoriented on the 'base material', and, thus, allows for parallel implementation of an optimization scheme which results in real time achievement of a solution at a given resolution.

SUMMARY OF THE INVENTION

The present invention relates to the nesting problem in which 'cut patterns' are placed on a 'base material' in a non-ovelapping manner to maximally utilize (maximizing yield via minimizing waste) the material. Thus, it is an object of the present invention to provide a process/ algorithm that enables a real time final nesting result. It is a further object of the present invention to provide a real time final nesting result which achieves a local minima of wasted material based on an optimal yield value or a maximization of yield subject to a time limit value.

These and other such objects which will become readily apparent are achieved via the process as described herein. Initially, information about the sheet material is provided to the algorithm via a digitized image of the material. This information contains such data as the location and shape of the defective areas, and stretch directions. In addition to this information, the type and the minimum number of cut patterns to be nested are provided to the algorithm. This data may consist of a unique identification number indicating the type of each cut pattern. The algorithm assumes availability/ access to a database containing information that correlates the type of cut pattern to the actual shape of the cut pattern. This information is stored in a form as required by the algorithm. In addition, the algorithm assumes communication/access to a database consisting of heuristic rules. This database provides rules for initial nesting obtained from human experts, including: "Place big parts first", "Put the largest possible part(s) in the empty region inscribed by another part", "Put non-movable parts on defected areas", etc. Here parts imply the cut patterns. This database also provides an optimum yield value and a time limit value.

The present invention alogrithm includes three main sections: an initialization portion, an exhaustive searching portion and a multiagent nesting portion. During the initialization stage, after having received the image and the order data pertaining to the shapes of the cut patterns (obtained from the cut patterns shape database), partial initial placement is identified (e.g. inscribed parts, defects etc.) using heuristic rules. The shapes of the sheet material and the cut patterns are then approximated by shapes such as polygons (low resolution) and initial placement is completed for the maximum possible number of cut patterns in an arbitrary manner that may involve human intervention.

During the exhaustive search portion, optimum placement for the lowest resolution of the digitized cut patterns is performed. Exhaustive search techniques are well known and any suitable techniques suffices. The purpose of the exhaustive search stage is to try all possible configurations (placement of the desired cut patterns with fixed number of positions on the hide and orientations per cut pattern) and find the one that minimizes the waste of the material at the lowest (initial) resolution. The criteria that aids the search process via quantification of minimal waste without overlap is given by potential functions. These potential functions are proportional to waste and strongly penalize overlap. The result of this placement becomes the best initial configuration of the cut patterns at the initial resolution. This global process may be time limited to achieve real time operation.

After each nesting, including the initial nesting provided by the exhaustive search, the cut patterns are slid to translate and/or orient without overlap to minimize waste. At this point, each cut pattern is assumed to have a processor that has the knowledge of its surrounding. Only this 'local' knowledge is used to adjust its position and orientation in a manner that will minimize the waste. This is again aided by the potential function approach with a time limitation to force real time operation. The real time operation is dictated by the combination of the number and speed of nesting stations and cutting stations. Verification between the actual and the desired/goal resolution of representation of the cut patterns/sheet material is then made, and if the actual and desired resolution are within a desired tolerance or acceptable level, then the current nesting becomes the final nesting. If not, a time limit is checked against a built in timer, and if the time limit is exceeded, then the current nesting becomes the final nesting result. Otherwise, the resolution of the description of the cut patterns/sheet material is increased, in steps, to satisfy the resolution requirement, and a multi-agent method is used to find a feasible locally optimal solution. During the multi-agent method stage, the possibility of improving upon the previous nesting exists due to the description of the cut patterns via increased resolution, exhaustive searching and adjustments. More specifically, the increased resolution may uncover empty space between cut patterns and/or may indicate overlap. Therefore, a time limited exhaustive search is performed (globally) with subsequent reorientation and translation (locally). This new arrangement is then compared with the desired resolution and iteration on the steps described above continues until a real time final nesting result in which a local minima of wasted material based on an optimal yield value or a maximization of yield subject to a time limit value is achieved.

BRIEF DESCRIPTION OF THE DRAWING

The present invention can be best understood in accordance with the specification taken in conjunction with the single drawing, wherein.

DETAILED DESCRIPTION OF INVENTION

Figure 1:
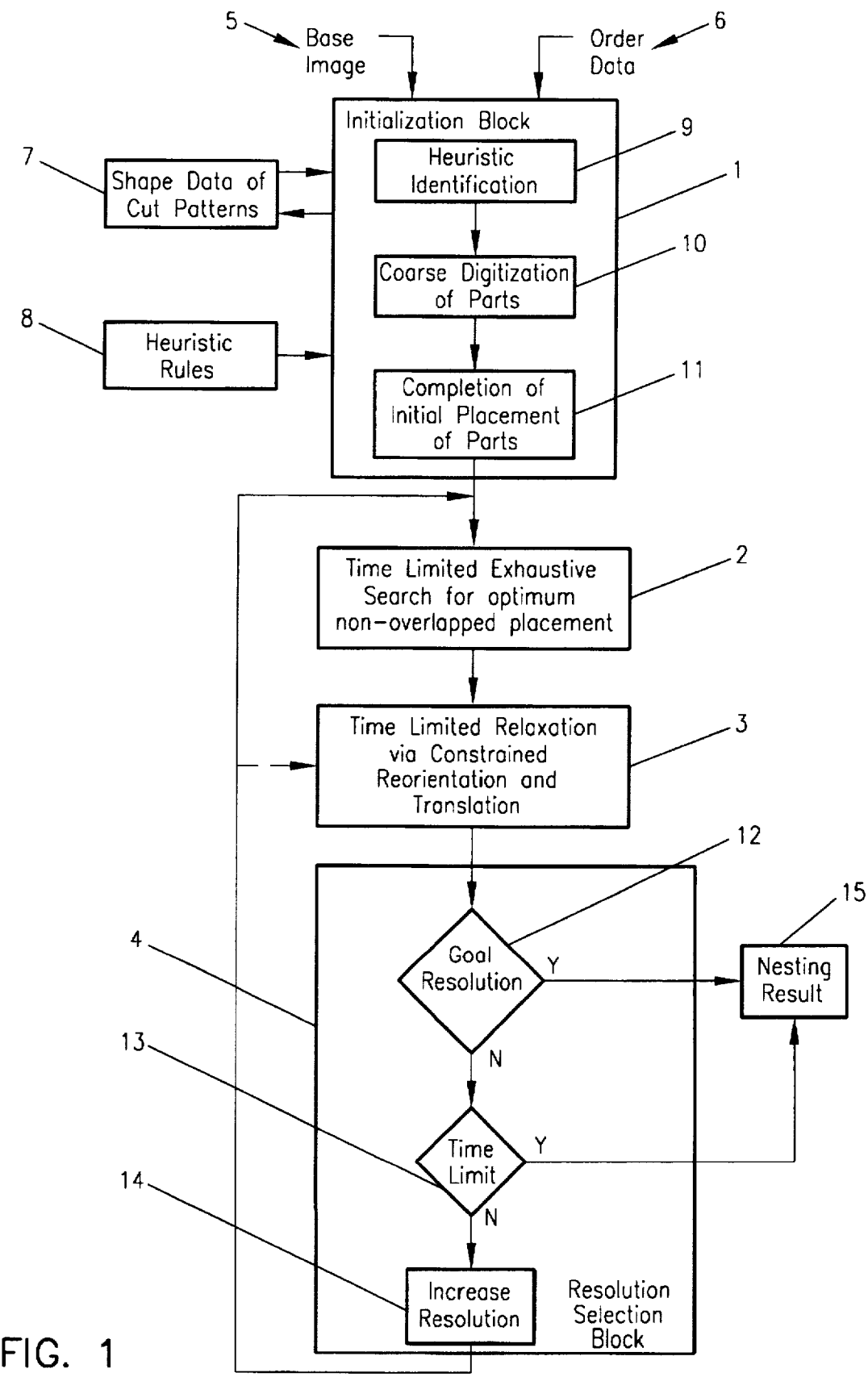
FIG. 1 depicts a block diagram of the nesting algorithm of the present invention.

The present invention relates to the nesting problem in which 'cut patterns' are placed on a 'base material' in a non-ovelapping manner to maximally utilize (maximizing yield via minimizing waste) the material. The present invention will now be described with reference to FIG. 1. Information about the sheet material is provided to the algorithm via a digitized image of the material. This information contains such data as the location and shape of the defective areas, and stretch directions, as represented by 'base image' 5. In addition to this information, the type and the minimum number of cut patterns to be nested are provided to the algorithm, as indicated by block 6, 'order data'. This data may consist of a unique identification number indicating the type of each cut pattern. The algorithm assumes availability/access to a database containing information that correlates the type of cut pattern to the actual shape of the cut pattern. This information is stored in a form as required by the algorithm, and is indicated by block 7 in FIG. 1. In addition, the algorithm assumes communication/access to a database consisting of heuristic rules, as shown by block 8 of FIG. 1. This database 8 provides rules for initial nesting obtained from human experts. These rules include: "Place big parts first", "Put the largest possible part(s) in the empty region inscribed by another part", "Put non-movable parts on defected areas", etc. Here parts imply the cut patterns. This database 8 also supplies a desired optimum yield value and a time limit value. These values play a key role in providing measures of comparison throughout the process of whether an optimal solution is being achieved, or whether the time limit is being approached. The above described initialization features occur within the first segment of the process, the initialization block 1.

The present invention process/algorithm also consists of three other main segments: 2, 3 and 4. In accordance with these blocks and block 1 above, the steps of the process will be described in more detail. Block 1 receives information from the 'order data' 6 and the digitized 'base image' 5. Based upon the 'order data' 6, appropriate shapes of the cut patterns are selected/obtained from the cut patterns 'shape database' 7. This database, in essence, contains an entire library of the various shapes of dies that can be utilized to approximate a plurality of different desired cut parts. Using heuristic rules 8, partial initial placement is identified (e.g. inscribed parts, defects etc.). This heuristic identification is achieved by block 9. The cut patterns and sheet material are then approximated by shapes such as polygons at a low resolution (gross, initial resolution). This course digitization is achieved by block 10. Finally the minimum number of parts are placed first and using additional heuristic rules the remaining empty spaces of the base, if there exists, are filled with the cut patterns. The completion of the initial placement of the parts, which may involve least possible human intervention, is achieved by block 11. At this point, gross arrangement of the parts is presented.

The second segment 2 of the process then commences to find the optimum arrangement/placement for the coarsely digitized cut patterns via exhaustive search techniques. Exhaustive search techniques are well known and any suitable techniques suffices. The purpose of the exhaustive search is to try all possible configurations (placement of the desired cut patterns with fixed number of orientations per cut pattern) to find the one that minimizes the waste of the material at the lowest (initial) resolution. The criteria that aids the search process via quantification of minimal waste without overlap is given by potential functions. These potential functions are proportional to waste and strongly penalize overlap. Such potential functions are discussed in the paper entitled "A Multitask Neuromorphic Controller for Redundant Robots", Bin Jin and Allon Guez, Proceedings of the 33rd IEEE International Conference on Decision and Control (Florida, December, 1994), and incorporated by reference herein. The result of this placement becomes the best global solution of the initial configuration of the cut patterns at the initial resolution. This process may be time limited to achieve real time operation. At this point, time limited relaxation via constrained reorientation and translation is performed. This stage, block 3, provides a local optimization solution in which the initial configuration is adjusted to fine tune the arrangement. More specifically, after the placement of the cut patterns by the exhaustive search stage 2, the cut patterns are oriented and/or translated by the multi-agent process of block 3 in a manner that no overlap occurs at the given resolution. Therefore, the cut patterns are to be slid to translate and/or orient without overlap to minimize waste. Here each cut pattern is assumed to have a processor that has the knowledge of its surrounding. Only this 'local' knowledge is used to adjust its position and orientation in a manner that will minimize the waste. This is again aided by the potential function approach with time limitation to force real time operation. The real time operation is dictated by the combination of number and speed of nesting stations and the cutting stations.

Next block 4, including blocks 12 and 14, are utilized to obtain subsequent results of nesting at a given resolution of digitization. After each nesting, including the initial nesting provided by the exhaustive search of block 2 and the reorientation and translation of block 3, it is verified if the desired or the goal resolution of the cut patterns has been achieved 12. If the answer is yes then the current nesting becomes the final nesting and a final nesting result is achieved, block 15. If the answer is no, the time limit value is compared to a built in timer 13 to evaluate whether or not the time limit value has been exceeded or is close to being exceeded. If the time limit is exceeded, the nesting at that point becomes the final nesting result 15. If not, the resolution of the description of the cut patterns is increased by block 14 and again blocks 2 and 3 are utilized to find a solution at this higher resolution via time limited exhaustive search techniques and multi-agent methods. The possibility of improvement upon the previous nesting is due to the description of the cut patterns via increased resolution. The increased resolution may uncover empty space between cut patterns and/or may indicate overlap. Thus, it is nesessary to again perform a time-limited exhaustive search 2, adjust this new arrangement with a time-limited relaxation stage via constrained reorientation and translation 3, and check this new arrangement with the optimum yield value/time limit. This iterative procedure is performed until a final nesting result is achieved. In this manner, re-arrangement of the cut patterns via the iterative process described herein provides a process for achieving a local minima of wasted material based on an optimum yield value or a maximization of yield subject to a time limit value to obtain a real time final nesting result.

It should also be noted, as indicated via the dotted arrow in FIG. 1, that in cases where the time limit value has not been exceeded, but is close to being exceeded, the exhaustive search stage 2 could be omitted to save on time. In this situation, the process would proceed directly to the timne limited relaxation stage 3 after an increase in resolution.

What is claimed is:

1. A hierarchical multi-resolution, multi-agent parts nesting process for achieving a local minima of wasted material based on an optimum yield value or a maximization of yield subject to a time limit value and parts and material constraints to obtain a real time final nesting result, comprising the steps of:

I)
  (a) transmitting an image of an outline of a piece of material and related data to a processor to provide a low resolution image,
  (b) storing a first set of information relating to a plurality of parts to a processor, said first set of information including a number of the plurality of parts to be arranged on the image to be cut from the piece of material and identification means for identifying types of parts to be cut,
  (c) providing a die database having a second set of information, the second set of information including a plurality of shapes representing a plurality of dies,
  (d) providing a set of heuristic rules, including priority instructions, a desired optimum yield value and a time limit value,
  (e) integrating/correlating, via means associated with a processor, the first set of information, the second set of information and the heuristic rules for determining an initial placement of parts at a first gross resolution,
  (f) simulating an initial placement of parts at the first gross resolution, II) performing a search to obtain an optimum non-overlapped placement of the parts on the image based on the resolution by utilizing a time-limited exhaustive search technique; and, III) performing time-limited relaxation via constrained reorienting and translating of the parts, thereby obtaining an adjusted optimum non-overlapped placement of the parts based on the optimum non-overlapped placement of the parts; and IV) comparing the adjusted optimum non-overlapped placement of the parts with the desired optimum yield value, and, in response, either:
  A) making the adjusted optimum non-overlapped placement of the parts, the final placement of the parts, thereby obtaining a final nesting result, or
  B) comparing the time limit value with a built in timer, and, in response, either:
    I) making the adjusted placement of the parts the final placement of the parts, thereby obtaining a final nesting result; or
    ii) (a) adjusting/increasing the resolution, thereby, obtaining a new resolution; and
    (b) iteratively performing steps II), III) and IV) until a final nesting result is achieved, wherein the final placement of the parts represents an optimal local minima of wasted material based on the optimum yield value, or represents maximization of yield subject to the time limit value.

2. The process of claim 1 wherein the step of transmitting includes transmitting the image via digitization.

3. The process of claim 1 wherein the step of performing a search includes utilizing a first set of potential functions to determine a real-time cost effective solution to obtain the optimum non-overlapped placement of the parts.

4. The process of claim 3 wherein the first set of potential functions provides a global optimization simulation of the placement of the parts.

5. The process of claim 1 wherein the step of performing time-limited relaxation includes utilizing a second set of potential functions to guide displacement of each of the plurality of parts.

6. The process of claim 5 wherein the second set of potential functions provides a local optimization simulation of the placement of the parts.

7. A hierarchical multi-resolution, multi-agent parts nesting process for achieving a local minima of wasted material based on an optimum yield value or a maximization of yield subject to a time limit value and parts and material constraints to obtain a real time final nesting result, comprising the steps of:

I)
  (a) transmitting an image of an outline of a piece of material and related data to a processor to provide a low resolution image,
  (b) storing a first set of information relating to a plurality of parts to a processor, said first set of information including a number of the plurality of parts to be arranged on the image and identification means for identifying types of parts to be cut,
  (c) providing a die database having a second set of information, the second set of information including a plurality of shapes representing a plurality of dies,
  (d) providing a set of heuristic rules, including priority instructions, a desired optimum yield value and a time limit value,
  (e) integrating/correlating, via means associated with a processor, the first set of information, the second set of information and the heuristic rules for determining an initial placement of parts at a first gross resolution,
  (f) simulating an initial placement of parts at the first gross resolution, II) performing a search to obtain a first optimum non-overlapped placement of the parts on the image based on the first gross resolution by utilizing a time-limited exhaustive search technique; and III) performing time-limited relaxation via constrained reorienting and translating of the parts, thereby obtaining an adjusted optimum non-overlapped placement of the parts based on the optimum non-overlapped placement of the parts; and IV) comparing the adjusted optimum non-overlapped placement of the parts with the desired optimum yield value, and, in response, either:

A) making the adjusted non-overlapped placement of the parts, the final placement of the parts, thereby obtaining a final nesting result, or B) checking the time limit value with a built in timer, and, in response, either:
  I) making the adjusted placement of the parts the final placement of the parts, thereby obtaining a final nesting result; or
  ii) (a) adjusting/increasing the resolution, thereby, obtaining a new resolution;
  (b) performing time-limited relaxation via constrained reorienting and translating of the parts to obtain a new placement of parts;
  (c) comparing the new placement of parts with the desired optimum yield value, and, in response, either:
    1) making the new placement of parts the final placement of parts, thereby obtaining a final nesting result, or
    2) iteratively performing step B) until a final nesting result is achieved, wherein the final placement of the parts represents an optimal local minima of wasted material based on the optimum yield value, or represents maximization of yield subject to the time limit value.

8. The process of claim 7 wherein the step of transmitting includes transmitting the image via digitization.

9. The process of claim 7 wherein the step of performing a search includes utilizing a first set of potential functions to determine a real time cost effective solution to obtain the optimum non-overlapped placement of the parts.

10. The process of claim 9 wherein the first set of potential functions provides a global optimization simulation of the placement of the parts.

11. The process of claim 7 wherein the step of performing time-limited relaxation includes utilizing a second set of potential functions to guide displacement of each of the plurality of parts.

12. The process of claim 11 wherein the second set of potential functions provides a local optimization simulation of the placement of the parts.

* * * * *